United States Patent
Hayes

(10) Patent No.: US 7,941,059 B1
(45) Date of Patent: May 10, 2011

(54) DOWN CONVERSION FOR DISTORTION FREE RECOVERY OF A PHASE MODULATED OPTICAL SIGNAL

(75) Inventor: Robert R. Hayes, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 596 days.

(21) Appl. No.: 11/796,172

(22) Filed: Apr. 27, 2007

Related U.S. Application Data

(60) Provisional application No. 60/765,987, filed on Apr. 28, 2006.

(51) Int. Cl.
H04B 10/06 (2006.01)
(52) U.S. Cl. .......................... 398/203; 398/204; 398/209
(58) Field of Classification Search .......... 398/203–204, 398/206
See application file for complete search history.

(56) References Cited

U.S. PATENT DOCUMENTS

| | | | | |
|---|---|---|---|---|
| 3,961,262 A * | 6/1976 | Gassmann | ...................... | 455/207 |
| 4,468,766 A * | 8/1984 | Spezio | ........................... | 359/326 |
| 4,718,121 A * | 1/1988 | Epworth | ........................ | 398/203 |
| 4,944,025 A * | 7/1990 | Gehring et al. | ............... | 455/207 |
| 4,965,858 A * | 10/1990 | Naito et al. | ..................... | 398/205 |
| 5,003,626 A * | 3/1991 | Kuwahara et al. | ............ | 398/204 |
| 5,007,106 A * | 4/1991 | Kahn et al. | ..................... | 398/203 |
| 5,023,946 A * | 6/1991 | Yamazaki et al. | ............ | 398/204 |
| 5,035,245 A * | 7/1991 | Nakamura et al. | ............ | 600/455 |
| 5,060,312 A * | 10/1991 | Delavaux | ...................... | 398/204 |
| 5,124,828 A * | 6/1992 | Mahon | ........................... | 398/204 |
| 5,281,973 A * | 1/1994 | Murphy et al. | ................. | 342/62 |
| 5,319,438 A * | 6/1994 | Kiasaleh | ........................ | 398/203 |
| 5,323,258 A * | 6/1994 | Tsushima et al. | ............. | 398/203 |
| 5,337,056 A * | 8/1994 | Dax | ............................... | 342/128 |
| 5,400,167 A * | 3/1995 | Suemura | ........................ | 398/209 |
| 5,412,351 A * | 5/1995 | Nystrom et al. | ............... | 332/103 |
| 5,424,863 A | 6/1995 | Gertel | | |
| 5,510,927 A * | 4/1996 | Noe | ................................ | 398/204 |
| 5,532,857 A * | 7/1996 | Gertel et al. | ................... | 398/198 |
| 5,757,531 A * | 5/1998 | Tomesen et al. | .............. | 398/204 |
| 5,777,778 A | 7/1998 | Yao | | |
| 5,861,781 A * | 1/1999 | Ashby | ............................ | 332/170 |
| 5,926,496 A * | 7/1999 | Ho et al. | .......................... | 372/92 |
| 6,091,535 A * | 7/2000 | Satoh | ............................... | 359/239 |
| 6,094,285 A * | 7/2000 | Wickham et al. | .................. | 398/1 |
| 6,233,085 B1 | 5/2001 | Johnson | | |
| 6,269,200 B1 * | 7/2001 | Wickham et al. | ............... | 385/15 |

(Continued)

OTHER PUBLICATIONS

USPTO Notice of Allowance Issue Fee Due, mailed Sep. 20, 2010, for U.S. Appl. No. 11/413,270 filed on Apr. 28, 2006, inventor Robert R. Hayes.

(Continued)

*Primary Examiner* — Ken N Vanderpuye
*Assistant Examiner* — Danny W Leung
(74) *Attorney, Agent, or Firm* — Christopher R. Balzan

(57) ABSTRACT

In one embodiment, a down conversion receiver is provided for a phase modulated optical signal. This may include an optical coupler coupled to be capable of receiving a phase modulated signal and a local oscillator signal, and a modulator coupled to an input of the optical coupler so as to be capable of modulating one of: (1) a phase modulated signal; or (2) a local oscillator signal. A photodetector circuit is located to be capable of detecting signals coupled by the optical coupler, with a sub-band selector circuit coupled to be capable of receiving signals from the photodetector circuit. The sub-band selector circuit has an output coupled to a modulating input of the modulator.

29 Claims, 2 Drawing Sheets

U.S. PATENT DOCUMENTS

| | | |
|---|---|---|
| 6,580,532 B1 | 6/2003 | Yao et al. |
| 6,580,851 B1 * | 6/2003 | Vahala et al. .................... 385/30 |
| 6,850,749 B2 * | 2/2005 | Soorapanth et al. .......... 455/318 |
| 6,901,224 B1 * | 5/2005 | Davis ............................. 398/202 |
| 6,914,560 B2 * | 7/2005 | Spilker et al. ................. 342/458 |
| 6,985,698 B2 * | 1/2006 | Aggarwal et al. ............... 455/62 |
| 7,103,327 B2 * | 9/2006 | Pan ............................... 455/102 |
| 7,200,343 B2 | 4/2007 | Ikeuchi |
| 7,266,311 B2 * | 9/2007 | Haunstein et al. ............ 398/209 |
| 7,330,669 B2 * | 2/2008 | Moeller ........................ 398/204 |
| 7,368,694 B2 * | 5/2008 | Goulas et al. ................. 250/205 |
| 7,382,257 B2 * | 6/2008 | Thomas et al. ............ 340/572.1 |
| 7,389,055 B1 * | 6/2008 | Rickard et al. ................ 398/206 |
| 7,394,331 B2 | 7/2008 | Yeung et al. |
| 7,397,979 B2 * | 7/2008 | Shpantzer et al. .............. 385/14 |
| 7,406,269 B2 * | 7/2008 | Becker et al. ................. 398/206 |
| 7,444,085 B2 * | 10/2008 | Ikeuchi et al. ................ 398/202 |
| 2002/0180538 A1 * | 12/2002 | Soorapanth et al. ............ 331/74 |
| 2003/0009283 A1 * | 1/2003 | Pratt ............................. 701/213 |
| 2003/0090767 A1 * | 5/2003 | Yap et al. ....................... 359/181 |
| 2003/0092388 A1 * | 5/2003 | Aggarwal et al. ............... 455/62 |
| 2003/0193711 A1 | 10/2003 | Hildebrand |
| 2004/0160661 A1 * | 8/2004 | Hurrell et al. ................. 359/325 |
| 2004/0259518 A1 * | 12/2004 | Aktas et al. ................... 455/323 |
| 2005/0100281 A1 | 5/2005 | Kim et al. |
| 2005/0111789 A1 * | 5/2005 | Hayes ............................. 385/27 |
| 2006/0045809 A1 | 3/2006 | Shirai et al. |
| 2006/0120733 A1 * | 6/2006 | Tucker et al. ................. 398/204 |
| 2006/0211386 A1 * | 9/2006 | Thomas et al. ................ 455/104 |
| 2007/0071456 A1 * | 3/2007 | Chen et al. .................... 398/204 |
| 2009/0047030 A1 * | 2/2009 | Hoshida ........................ 398/205 |

OTHER PUBLICATIONS

USPTO Final Office Action, mailed Nov. 25, 2009, for U.S. Appl. No. 11/413,270 filed on Apr. 28, 2006, inventor Robert R. Hayes.

USPTO Office Action, mailed Apr. 15, 2009, for U.S. Appl. No. 11/413,270 filed on Apr. 28, 2006, inventor Robert R. Hayes.

* cited by examiner

DOWN CONVERSION FOR DISTORTION FREE RECOVERY OF A PHASE MODULATED OPTICAL SIGNAL

CROSS-REFERENCE TO RELATED APPLICATION

The present application claims the benefit of U.S. Provisional Patent Application No. 60/765,987, filed Apr. 28, 2006, by Robert R. Hayes, entitled DOWN CONVERSION FOR DISTORTION FREE RECOVERY OF A PHASE MODULATED OPTICAL SIGNAL, herein incorporated by referenced in its entirety.

The present application is related to U.S. patent application Ser. No. 11/413,270 filed Apr. 28, 2006, by Robert R. Hayes et al., entitled COHERENT RF-PHOTONIC LINK LINEARIZED VIA A NEGATIVE FEEDBACK PHASE-TRACKING LOOP, herein incorporated by reference in its entirety.

BACKGROUND

The photonic transmission of high frequency microwave signals is typically accomplished by impressing the RF as an envelope on the amplitude of an optical carrier, using either an electro-optic (EO) or electro-absorption (EA) modulator. Although linearized EO modulators have been proposed for many years, the vast majority of modulators available for analog transmission still suffer from intrinsic nonlinearities in their transfer function. For example, the most common Mach Zehnder EO modulator possesses a raised-cosine modulation transfer curve.

As a result, intermodulation products and harmonic distortions are incurred at the transmitter end of these intensity or amplitude modulated analog links, giving rise to well-known impairments of the link's spur free dynamic range (SFDR).

Thus, what is needed is a high spur free dynamic range in an optical link. Further, what is needed is a high spur free dynamic range in an optical link for high frequency signals.

SUMMARY

In one implementation, a method is provided for recovering phase information from a sub-band of an RF phase modulated optical carrier. In one implementation, this includes optically coupling a phase modulated optical signal and a local oscillator signal and differentially photodetecting the optically coupled phase modulated optical signal and local oscillator signal to generate a differentially photodetected signal. This implementation may further include detecting a sub-band of the differentially photodetected signal using quadrature signals to provide an RF output and modulating one of: (1) the phase modulated optical signal; or (2) the local oscillator signal with the RF output signal.

In one embodiment, a down conversion receiver is provided for a phase modulated optical signal. This may include an optical coupler coupled to be capable of receiving a phase modulated signal and a local oscillator signal, and a modulator coupled to an input of the optical coupler so as to be capable of modulating one of: (1) a phase modulated signal; or (2) a local oscillator signal. A photodetector circuit is located to be capable of detecting signals coupled by the optical coupler, with a sub-band selector circuit coupled to be capable of receiving signals from the photodetector circuit. The sub-band selector circuit has an output coupled to a modulating input of the modulator.

BRIEF DESCRIPTION OF THE DRAWINGS

The features and advantages of the present invention will be better understood with regard to the following description, appended claims, and accompanying drawings where:

DESCRIPTION

Down-conversion is a technique for piece-wise analyzing information spread over a broad frequency spectrum. The technique uses signal multiplication (mixing) to grab a particular portion of the band, and shift its frequency either to baseband or to a much lower intermediate frequency (IF) where the analysis can be performed more easily. There are, in principal, no theoretical penalties incurred in doing this, either in signal fidelity or in noise (other than that due to the conversion loss), if the components used are ideal, and if the information is amplitude-modulated onto the carrier. The same, however, cannot be said for phase modulation. A phase modulated signal is intrinsically distorted by conventional down-conversion.

Figure 1:
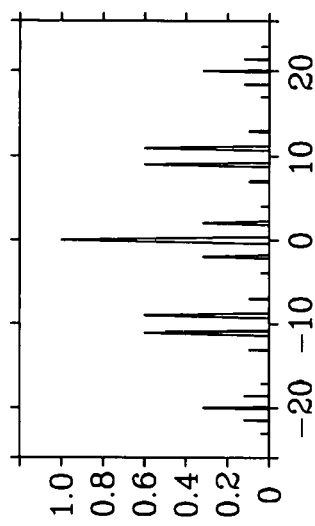
FIG. 1 shows a frequency spectrum for phase modulation by equal-amplitude tones at 9 and 11 GHz.

Turning to FIG. 1, shown is a frequency spectrum for phase modulation by equal-amplitude tones at 9 and 11 GHz. The reason that the phase modulated signal is intrinsically distorted by conventional down-conversion may be explained as follows. Consider a two-tone signal with tones at 9 and 11 GHz that has been phase-modulated onto an optical (or microwave) carrier using a perfectly linear phase modulator. If one analyzes this signal using an optical spectrum analyzer, one sees the spectrum shown in FIG. 1. Note that, in addition to the carrier and the harmonically-related sidebands associated with the phase modulation of the two tones, one has additional tones at $f_c \pm (2f_2 - f_1)$, $f_c \pm (2f_1 - f_2)$, $f_c \pm (f_1 + f_2)$ and so on. These tones, which are normally associated with intermodulation due to nonlinearity, paradoxically appear in the frequency spectrum generated by this perfectly linear device.

If the phase of the original optical wave is measured by accurately tracking the phase, then the intermodulation terms observed in the amplitude spectrum play no role. The tracked phase is an exact replica of the transmitted phase, and the entire process of transmission and reception is perfectly linear. If, however, only a portion of the entire spectrum is used and the phase or amplitude is measured, then the intermodulation terms manifest themselves and corrupt the received signal. This is most obvious for very narrow-band conventional down-conversion, in which all phase information is lost, and in which simply the amplitude of each of the individual tones of the optical spectrum of FIG. 1 is measured, including the undesired intermodulation tones.

Conventional down-conversion, therefore, cannot be used as a precursor to high-linearity phase demodulation. To achieve high-fidelity down-conversion, various embodiments down-convert in the phase domain, and not in the amplitude domain. This will be described in detail further below.

One way to realize the benefits of linear phase modulation (high signal fidelity, high spur free dynamic range), is to receive the entire frequency spectrum of the original optical wave intact, so that the phase information is not corrupted, and then demodulate the phase information by locking onto a particular crest (or crossover point) of this incoming wave (relative to an unmodulated wave) and riding that crest back and forth as fast as it wiggles. The accuracy of riding the crest at higher frequencies can be less than that at lower, without losing the lock-point. The phase-tracker described in the above referenced invention entitled COHERENT RF-PHOTONIC LINK LINEARIZED VIA A NEGATIVE FEEDBACK PHASE-TRACKING LOOP, by Robert Hayes, et al., incorporated by reference, in some embodiments is capable of doing this over the entire 20 GHz information band. Because some embodiments lag behind the lock-point on the wave at higher frequencies, and because this lag allows some distortion, the SFDR at higher frequencies can be seriously reduced from the values achievable at lower frequencies.

One way to sidestep this problem is to down-convert some portion of the phase information to baseband so that the phase-tracker can accurately track the phase at the lower frequencies, at which it excels. Because normal down-conversion destroys some or all of the phase information, a technique is needed to extract the desired portion of the phase information without damaging it.

A phase tracker operates by minimizing the function:

$$\sin(\phi(t)-\theta(t))$$

where $\phi(t)$ is the information-carrying phase of the received lightwave, and $\theta(t)$ is a phase generated by the tracking loop. If $\theta(t)$ is instantaneously adjusted, to be equal to $\phi(t)$, then the argument of the sine function is always zero, and accurate tracking of the crossover point of the wave occurs. Because $\theta(t)$ is generated with a perfectly linear phase modulator in the receiver, the feedback voltage used to drive this phase modulator will be linearly proportional to $\phi(t)$. If the argument is not zero, then one has distortional components that can be thought of as being generated by the nonlinearity of the sine function. Because these are, to first order, proportional to the cube of the argument, modest increases in the size of the argument can lead to sizeable increases in the intermodulation components. Hence, the crux to any tracking scheme is: replicate $\phi(t)$ as accurately as possible.

In various implementations, $\phi(t)$ is accurately replicated using a two-parameter function that can replicate any arbitrary $\phi(t)$ in a narrow band centered at $f_c$. This function, $$\theta(t)=\alpha(t)\cos(2\pi f_c t)+\beta(t)\sin(2\pi f_c t),$$

consists of two rapidly-varying sinusoidal terms that are multiplied by two slowly-varying functions, $\alpha(t)$ and $\beta(t)$.

Figure 2:
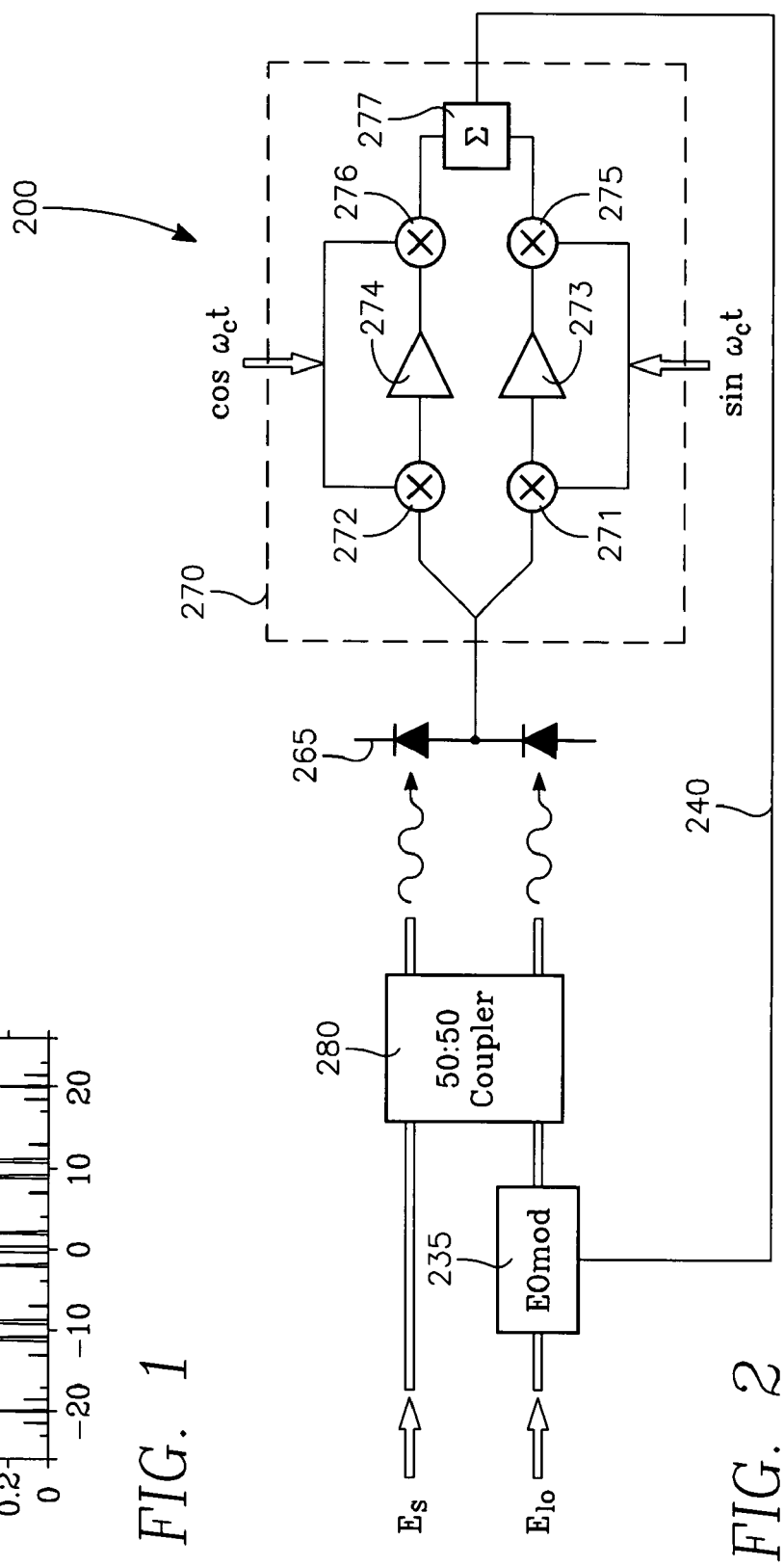
FIG. 2 show a simplified circuit diagram of one possible embodiment of a down conversion receiver for low distortion recovery of a phase modulated optical signal.

Turning to FIG. 2, shown is a simplified circuit diagram of one possible embodiment of a down conversion receiver 200 for low distortion recovery of a phase modulated optical signal. The function $\theta(t)$ is generated electrically by multiplying the voltages of an external oscillator, having in-phase and quadrature components indicated as $\cos \omega_c t$ and $\sin \omega_c t$, respectively, using the multipliers 276 and 275 following the op amps 274 and 273 respectively. The functions $\alpha(t)$ and $\beta(t)$ are thus proportional to the output voltages of the two op amps 273 and 274. The composite signal is used to modulate the phase of a light beam coming from the same signal laser (not shown), but without the $\phi(t)$ modulation. The two beams, $E_s \cos[\omega t+\phi(t)]$ and $E_{lo} \cos[\omega t+\theta(t)]$ are combined with coupler 280 and mixed in the dual-balanced photodetectors 265, yielding the electrical signal $2\sqrt{I_s I_{lo}} \sin(\phi(t)-\theta(t))$.

Because the mixing process already provides the negative sign needed for negative feedback in loop 240, the op amps 274 and 273 are used in a non-inverting mode. However, when the sign of the $\sin \omega_c t$ or $\cos \omega_c t$ is negative, the feedback becomes positive, and the feedback loop 240 misbehaves. In order to prevent this, the input to each amp 274 and 273 is multiplied with a second set of multipliers 272 and 271, whose sole function is to switch the sign of the incoming voltage so that the feedback in loop 240 is always negative. A summer 277 sums the in-phase and quadrature components of the differentially detected signal at the selected frequency $\omega_c$ and provides an RF output, which is fed back to the modulating input of the EOmod 235.

These multipliers 272 and 271 could be replaced by a simple electronic commutator, which could switch the input from the positive to the negative port of the op amps. This insertion of sign-switchers (multiplers 272 and 271, commutator, etc.) at the input of each op amp 274 and 273 provide stability for circuit 200, and the multipliers or switchers 272 and 271 at the front of each op amp select out either $\alpha(t)$ or $\beta(t)$ by Fourier decomposition. They do this by performing full-wave rectification on their respective oscillating counterparts in the argument. This rectification converts the oscillating signal into a slowly-varying signal that can be tracked by the amplifiers 274 and 273. The switcher 272 of the top amplifier 274, for example, rectifies the $\cos \omega_c t$ term in the argument, as well as the matching term that must exist in $\phi(t)$. The $\alpha(t)\cos \omega_c t$ term is thereby reduced to $\frac{1}{2}\alpha(t)$ plus an oscillating term, whereas the $\beta(t)\sin \omega_c t$ term in the argument becomes an oscillating term that has no rectified component. Because an op amp acts like an integrator at these frequencies, it essentially ignores the oscillating terms, and focuses solely on the $\frac{1}{2}\alpha(t)$ term and the matching term extracted from $\phi(t)$. The input multipliers or switchers 272 and 271 and the following op amps 274 and 273, respectively, thus perform the mathematical operation of Fourier coefficient extraction: they multiply a term by $\cos \omega_c t$ or $\sin \omega_c t$ and integrate it over time. This determines $a(t)$ for the top op amp 274, and $\beta(t)$ for the bottom op amp 273. It also explains why the two parallel paths of the op amps 274 and 273 do not interact; neither sees the other because of their orthogonality. Therefore, although the differential equations shown below for the two parallel paths of the op amps 274 and 273 appear to be coupled, in reality they are not (or at best only weakly so).

The system may be analyzed by numerically solving the nonlinear differential equations for the feedback loops, $$\tau\frac{dV_\alpha}{dt}+V_\alpha = H\sin\left[\frac{\pi}{V_{\pi 1}}V(t)-\frac{\pi}{V_{\pi 2}}V_\alpha(t-\tau_d)\cos[\omega_c t]-\frac{\pi}{V_{\pi 2}}V_\beta(t-\tau_d)\sin[\omega_c t]\right]\cos[\omega_c t]$$

$$\tau\frac{dV_\beta}{dt}+V_\beta = H\sin\left[\frac{\pi}{V_{\pi 1}}V(t)-\frac{\pi}{V_{\pi 2}}V_\alpha(t-\tau_d)\cos[\omega_c t]-\frac{\pi}{V_{\pi 2}}V_\beta(t-\tau_d)\sin[\omega_c t]\right]\sin[\omega_c t]$$

where $\tau$ and $V_{\alpha,\beta}$ are the decay time and output voltages of the operational amplifiers, $\tau_d$ is the feedback loop delay-time, $V(t)$ the received signal voltage, and H is given by:

$$H=2\sqrt{I_{lo}I_s}DG_o$$

The I's are the local oscillator and signal powers expressed as a detector current, D is the input transimpedance of the amplifier 274 or 273, and $G_o$ is the zero-frequency gain of the op amp 274 or 273. The parameters used for this and other simulations were

| τ | $\tau_d$ | $V_{\pi 1}$ | $V_{\pi 2}$ | $I_{lo}$ | $I_s$ | G | D |
|---|---|---|---|---|---|---|---|
| .6 ns | 15 ps | π volts | 10 π volts | 0.01 A | 0.10 A | 100 | 50 Ω |

Using these values, we adjusted the loops for maximum performance by reducing τ until they broke into oscillation, and then backing off by approximately 50%. Using this procedure we found that the down-conversion loops had to be operated with a τ of 600 ps, as compared with the 400 ps values used in the baseband loop (which had a single amplifier with no multipliers). On reflection, we also realized that the rectification process which produced the ½α(t) term also reduced the loop gain by just that factor of one-half. The overall loop gain that gave stable operation was thus a factor of three lower than that of the baseband loop. The fact that it had to be lower in order to remain stable suggests that the sign-flippers somehow increases the loop's effective transit time.

The amplifier response plays no role in the shape of this curve, but does determine the response of the baseband receiver, and the instantaneous bandwidth of the down-conversion receiver 200.

Various embodiments and implementations, of the optical technique discussed herein allow down-conversion and detection, of the phase modulation on an optical carrier with high accuracy. Furthermore, various embodiments and implementations, allow recovery of the phase information with almost no distortion (SFDR>140 dBm $Hz^{2/3}$), even though this recovery takes place over a subset of the frequency band for phase-modulated optical carriers.

Figure 3:
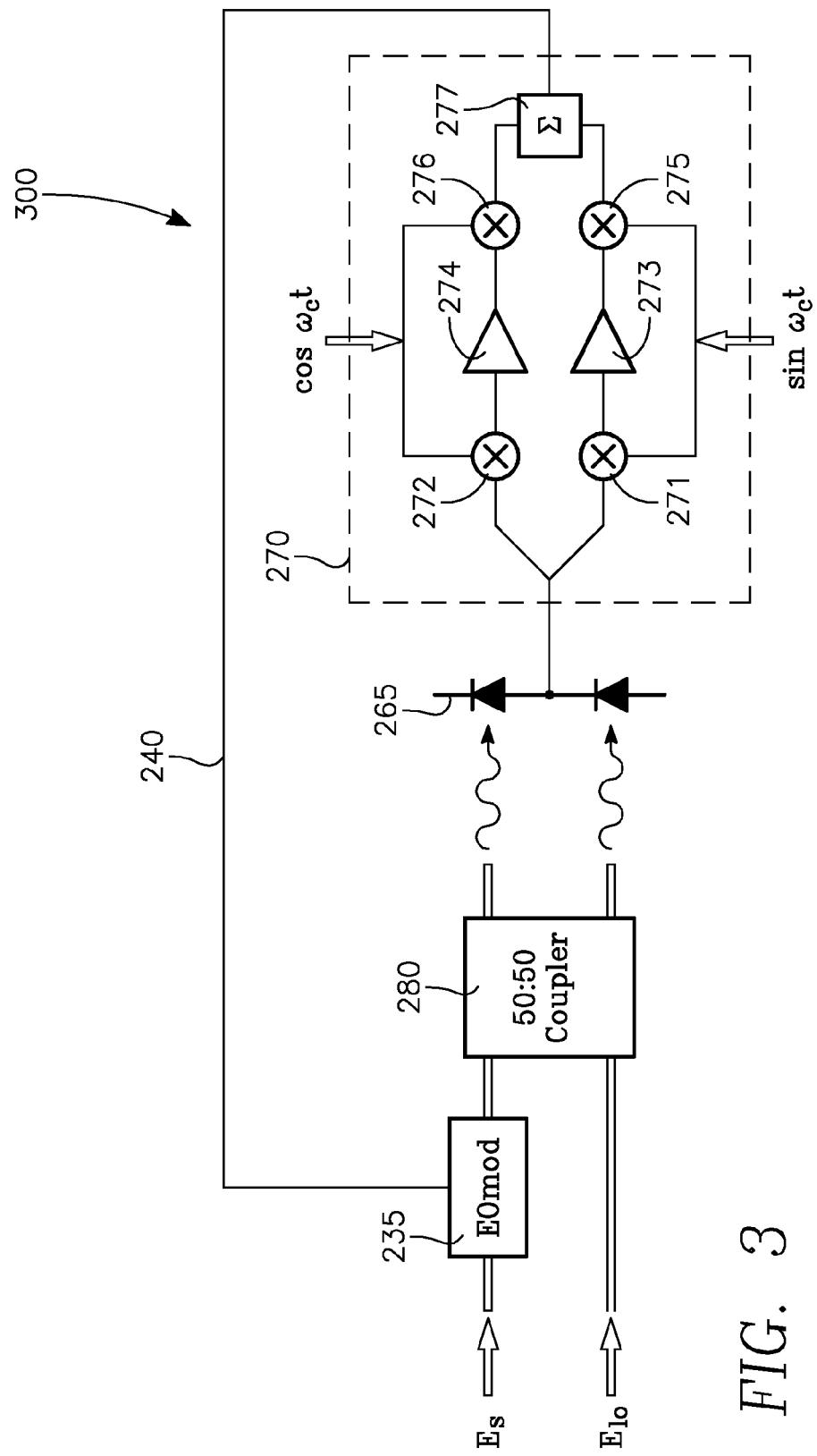
FIG. 3 shows a simplified circuit diagram of another possible embodiment of a down conversion receiver for low distortion recovery of a phase modulated optical signal.

In another embodiment shown in FIG. 3, the electro-optic modulator EOmod 235 is positioned in the circuit 300 to modulate the phase modulated signal $E_s$, rather than the local oscillator signal $E_{lo}$ as shown in FIG. 2. Thus, in the embodiment shown in FIG. 3, the summer 277 supplies a feedback via loop 240 to the EOmod 235 to modulate the optical input signal $E_s$. The output of the EOmod 235 is coupled with the local oscillator signal $E_{lo}$ using coupler 280 and supplied to the differential photodetectors 265 to provide differential current signals to the sub-band selector or quadrature circuit 270.

Various embodiments and implementations described herein may be embodied and/or implemented in the phase modulated RF-photonic link disclosed in the above referenced invention entitled COHERENT RF-PHOTONIC LINK LINEARIZED VIA A NEGATIVE FEEDBACK PHASE-TRACKING LOOP, by Robert Hayes, et al., incorporated by reference. Thus, down conversion may be utilized in the receivers of the embodiments disclosed therein. In the embodiments of the referenced application, the amplifier may be replaced with the quadrature circuit 270.

The circuit 200 uses a similar phase tracking approach as described in the above referenced COHERENT RF-PHOTONIC LINK LINEARIZED VIA A NEGATIVE FEEDBACK PHASE-TRACKING LOOP application: tracking is achieved by monitoring the difference between the incoming phase modulation and the phase modulation generated by a feedback loop employing an internal linear optical phase modulator 235, and drives the difference to zero. When this is achieved, the phase modulation generated by the feedback loop 240 has replicated the incoming modulation. The distinguishing feature of some embodiments described herein is a synchronous detection scheme that instantaneously and accurately replicates the phase modulated signal in a particular sub-band of the modulation spectrum, and does this by operating within the feedback loop 240, so that the magnitude of the detected signals are vanishingly small and hence have ultra-low distortion. The use of a tunable local oscillator at frequency $\omega_c$ allows the center of the sub-band to be shifted to any point within the modulation spectrum. As in the above referenced application, in some implementations the modulating voltage applied to the internal linear phase modulator 235 of the receiver is also the output signal of the receiver. This modulating voltage is a high-fidelity replication of the RF information in the transmitted signal E.

Having described this invention in connection with a number of embodiments, modification will now certainly suggest itself to those skilled in the art. As such, the invention is not to be limited to the disclosed embodiments except as required by the appended claims.

What is claimed is:

1. A method for recovering phase information from a sub-band of an RF phase modulated optical carrier, the method comprising:
   a) optically coupling a phase modulated optical signal and a local oscillator signal;
   b) differentially photodetecting the optically coupled phase modulated optical signal and local oscillator signal to generate a differentially photodetected signal;
   c) detecting a sub-band of the differentially photodetected signal using quadrature signals to provide an RF output; and
   d) modulating one of: (1) the phase modulated optical signal; or (2) the local oscillator signal with the RF output signal such that the RF output signal substantially replicates an RF phase modulation on the RF phase modulated optical signal.

2. The method of claim 1 comprising modulating the local oscillator signal using the RF output signal.

3. The method of claim 1 comprising modulating the phase modulated optical signal using the RF output signal.

4. The method of claim 1, wherein detecting the sub-band comprises mixing in-phase and quadrature components of an external oscillator with the differentially photodetected signal.

5. The method of claim 4 wherein detecting the sub-band comprises amplifying the differentially photodetected signal prior to mixing.

6. The method of claim 5, wherein detecting the sub-band comprises summing after mixing to provide the RF output.

7. The method of claim 6, wherein detecting the sub-band further comprises mixing in-phase and quadrature components of an external oscillator with the differentially photodetected signals prior to amplifying.

8. The method of claim 1, wherein detecting the sub-band comprises:
   a) amplifying the differentially photodetected signal;
   b) mixing amplified signals with in-phase and quadrature components of an external oscillator; and
   c) summing the mixed amplified signals.

9. The method of claim 8, comprising modulating the local oscillator signal with the summed signals.

10. The method of claim 9, further comprising mixing the in-phase and quadrature components with the differentially photodetected signal prior to amplifying.

11. The method of claim 8, comprising modulating the phase modulated signal with the summed signals.

12. The method of claim 11, further comprising mixing the in-phase and quadrature components with the differentially photodetected signal prior to amplifying.

13. The method of claim 8, further comprising mixing the in-phase and quadrature components with the differentially photodetected signal prior to amplifying.

14. A down conversion receiver for a phase modulated optical signal comprising:
   a) an optical coupler coupled to be capable of receiving a phase modulated signal and a local oscillator signal;
   b) a modulator coupled to an input of the optical coupler so as to be capable of modulating one of: (1) a phase modulated signal; or (2) a local oscillator signal;
   c) a photodetector circuit located to be capable of detecting signals coupled by the optical coupler; and
   d) a sub-band selector circuit comprising a quadrature circuit coupled to be capable of receiving signals from the photodetector circuit, the sub-band selector circuit having an output coupled to a modulating input of the modulator such that the output substantially replicates a phase modulation on the phase modulated signal.

15. The receiver of claim 14, wherein the sub-band selector comprises:
   a) a first path comprising:
      (1) a first mixer coupled to be capable of mixing an output of the photodetector circuit and an in-phase component output of an external oscillator;
      (2) a first amplifier having an input and an output, the input being coupled to the first mixer; and
      (3) a second mixer coupled to be capable of mixing the output of the amplifier and the in-phase component output of the external oscillator;
   b) a second path in parallel with the first path comprising:
      (1) a third mixer coupled to be capable of mixing the output of the photodetector circuit and a quadrature component output of the external oscillator;
      (2) a second amplifier having an input and an output, the input being coupled to the third mixer; and
      (3) a fourth mixer coupled so as to be capable of mixing the output of the amplifier to the quadrature component output of the external oscillator; and
   c) a summer coupled so as to be capable of summing outputs of the second mixer of the first path and of the fourth mixer of the second path so as to provide an output for use in modulating the modulator.

16. The receiver of claim 15, wherein the modulator is coupled to an input of the optical coupler so as to be capable of modulating the phase modulated signal.

17. The receiver of claim 16 wherein the photodetection circuit comprises differentially connected photodiodes.

18. The receiver of claim 15, wherein the modulator is coupled to an input of the optical coupler so as to be capable of modulating a local oscillator signal.

19. The receiver of claim 18, wherein the photodetection circuit comprises differentially connected photodiodes.

20. The receiver of claim 14, wherein the modulator is coupled to an input of the optical coupler so as to be capable of modulating the phase modulated signal.

21. The receiver of claim 14, wherein the modulator coupled to an input of the optical coupler so as to be capable of modulating a local oscillator signal.

22. The receiver of claim 14, wherein the photodetection circuit comprises differentially connected photodiodes.

23. A down conversion receiver for a phase modulated optical signal comprising:
   a) an optical coupler comprising a phase modulated signal input and a local oscillator signal input;
   b) a modulator connected to one of: (1) the phase modulated signal input; or (2) the local oscillator signal input;
   c) a photodetector circuit having an input optically coupled with an output of the optical coupler; and
   d) a sub-band selector circuit comprising a quadrature circuit connected to an output of the photodetector circuit, the sub-band selector circuit having an output coupled to a modulating input of the modulator such that the output substantially replicates a phase modulation on the phase modulated signal.

24. The receiver of claim 23, wherein the sub-band selector comprises:
   a) a first path comprising:
      (1) a first mixer having an input connected to the output of the photodetector circuit and an input connected to be capable of receiving an in-phase component of an external oscillator;
      (2) a first amplifier having an input connected to an output of the first mixer; and
      (3) a second mixer having an input connected to an output of the amplifier and to be capable of receiving the in-phase component of the external oscillator;
   b) a second path in parallel with the first path comprising:
      (1) a third mixer having an input connected to the output of the photodetector circuit and an input connected to be capable of receiving a quadrature component of the external oscillator;
      (2) a second amplifier having an input and an output, the input being coupled to the third mixer; and
      (3) a fourth mixer having an input connected to the output of the amplifier and an input connected to be capable of receiving the quadrature component of the external oscillator; and
   c) a summer having inputs connected to the second mixer of the first path and to the fourth mixer of the second path, the summer having an output connected to a modulating input of the modulator.

25. The receiver of claim 24, wherein the modulator is connected at the phase modulated signal input of the optical coupler.

26. The receiver of claim 24, wherein the modulator is connected at local oscillator signal input of the optical coupler.

27. The receiver of claim 23, wherein the modulator is connected at the phase modulated signal input of the optical coupler.

28. The receiver of claim 23, wherein the modulator is connected at the local oscillator signal input of the optical coupler.

29. The receiver of claim 23, wherein the photodetection circuit comprises differentially connected photodiodes.

* * * * *